(12) United States Patent
Huang et al.

(10) Patent No.: US 7,544,003 B2
(45) Date of Patent: Jun. 9, 2009

(54) DRIVING ASSEMBLY OF CAMERA SHUTTER AND DIAPHRAGM

(75) Inventors: Shih-Hsien Huang, Taichung (TW); Chi-Hsin Ho, Taichung (TW)

(73) Assignee: Tricore Corporation, Taichung (TW)

( * ) Notice: Subject to any disclaimer, the term of this patent is extended or adjusted under 35 U.S.C. 154(b) by 439 days.

(21) Appl. No.: 11/495,704

(22) Filed: Jul. 31, 2006

(65) Prior Publication Data

US 2008/0025720 A1  Jan. 31, 2008

(51) Int. Cl.
*G03B 9/08* (2006.01)
(52) U.S. Cl. ............... 396/463; 396/439; 396/464; 310/36; 310/37; 310/38; 310/39; 310/40 R; 310/41; 310/103
(58) Field of Classification Search ......... 396/439, 396/449, 458, 430, 463, 505, 507, 509, 464–469; 310/36–39, 40 R, 41, 43, 103
See application file for complete search history.

(56) References Cited

U.S. PATENT DOCUMENTS

| | | | | |
|---|---|---|---|---|
| 4,319,823 A | * | 3/1982 | Hashimoto | 396/463 |
| 4,334,748 A | * | 6/1982 | Stacklies et al. | 396/463 |
| 5,561,486 A | * | 10/1996 | SanGregory | 396/463 |
| 6,591,066 B2 | * | 7/2003 | Aoshima | 396/133 |
| 6,800,970 B2 | * | 10/2004 | Aoshima | 310/49 R |
| 7,304,409 B2 | * | 12/2007 | Horiike | 310/112 |
| 2006/0186742 A1 | * | 8/2006 | Miyawaki | 310/49 R |

* cited by examiner

*Primary Examiner*—W. B. Perkey
*Assistant Examiner*—Warren K Fenwick

(57) ABSTRACT

A driving assembly of camera shutter and diaphragm comprises a first stator, a second stator, a coil set and a rotor. The coil set is installed between the first stator and second stator. A first wing is axially extended from a round periphery of the first stator and a second wing is axially extended from a round periphery of the second stator. Each of the first stator and second wing is a round cambered sheet. In assembly the first stator and second wing are formed as a space for receiving the rotor; thus the rotor is driven to rotate by the magnetic force of the first wing and second wing so as to drive the diaphragm and shutter. Each of the first wing and second wing has a plurality of parts which are formed around the respective stator and are spaced with an equal spaced.

7 Claims, 5 Drawing Sheets

DRIVING ASSEMBLY OF CAMERA SHUTTER AND DIAPHRAGM

FIELD OF THE INVENTION

The present invention relates to camera parts, in particular to a driving assembly of a camera shutter and diaphragm, wherein the first stator, coil set, second stator and rotor are axially arranged so that the weight of the diaphragm and shutter of the camera is greatly reduced. Furthermore, the wings of the first stator and second stator are divided into several parts so that the rotation angle of the rotor is also reduced.

BACKGROUND OF THE INVENTION

In the current design, people want the diaphragm and shutter of a camera has a light weight so that it can be carried conveniently and easily. However the prior art design do not achieve this object.

Some improvements are developed for resolving such a problem. One prior art is illustrated in FIGS. 1 and 2, in that the motor body 9 has a stator 91, a coil 92 installed on the stator 91, a rotor 93 and a driven unit 94 which is driven by the rotor 93. The rotor 93 is pivotally installed near the two ends of the stator 91. When current flows through the coil 92, two ends of the stator 91 will form as an N pole and an S pole. Thereby when the rotor 93 rotates, the diaphragm and shutter will be driven by the driving unit 94 so as to close and open or adjust the size thereof.

In the portion camera, the stator 92, coil 92 and rotor 93 of a motor body 9 are not coaxial. Referring to FIGS. 1 and 2, due to the configuration of the stator 91 of the motor body 9, it has an oblong shape. As a result, it is also heavy.

Furthermore, in the prior art configuration of the stator 91, the rotation angle of the rotor 93 is multiple of 180 degrees. It can not be adjusted in a small angle. However the shuttering time will affect the quality of image. Thus the prior art design has effect the function of the camera.

As a whole, the prior art camera diaphragm and shutter make the camera being heavy and the rotation angle is large. Thus, it is not practical.

SUMMARY OF THE INVENTION

Accordingly, the primary object of the present invention is to provide a driving assembly of camera shutter and diaphragm, wherein the first stator, coil set, second stator and rotor are axially arranged so that the weight of the diaphragm and shutter of the camera is greatly reduced. Furthermore, the wings of the first stator and second stator are divided into several parts so that the rotation angle of the rotor is also reduced.

To achieve above objects, the present invention provides a driving assembly of camera shutter and diaphragm which comprises a first stator, a second stator, a coil set and a rotor. The coil set is installed between the first stator and second stator. A first wing is axially extended from a round periphery of the first stator and a second wing is axially extended from a round periphery of the second stator. Each of the first stator and second wing is a round cambered sheet. In assembly the first stator and second wing are formed as a space for receiving the rotor; thus the rotor is driven to rotate by the magnetic force of the first wing and second wing so as to drive the diaphragm and shutter. Each of the first wing and second wing has a plurality of parts which are formed around the respective stator and are spaced with an equal spaced. In assembly, the first wing and second wing are alternatively arranged so that the minimum rotation angle of the rotor is reduced.

The various objects and advantages of the present invention will be more readily understood from the following detailed description when read in conjunction with the appended drawing.

BRIEF DESCRIPTION OF TEE DRAWINGS

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
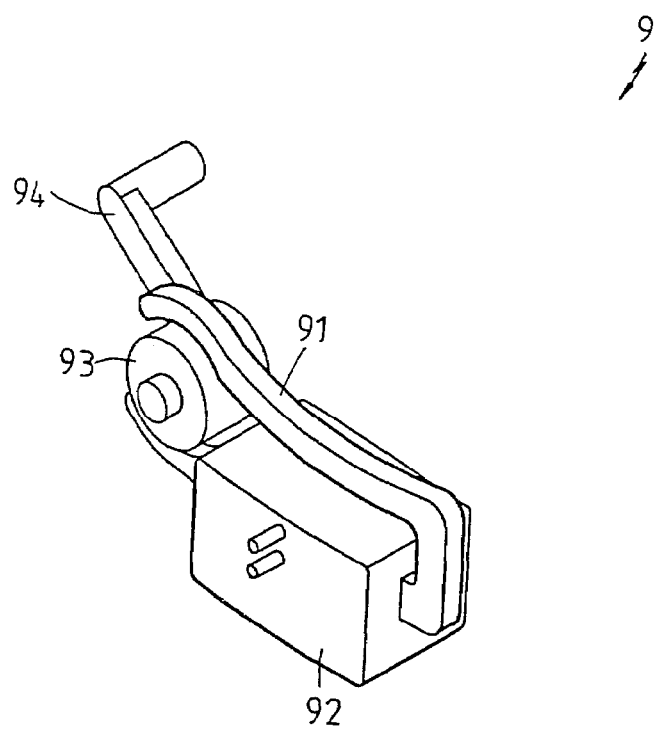
FIG. 1 is a perspective view of the prior art driving assembly of camera shutter and diaphragm.
Figure 2:
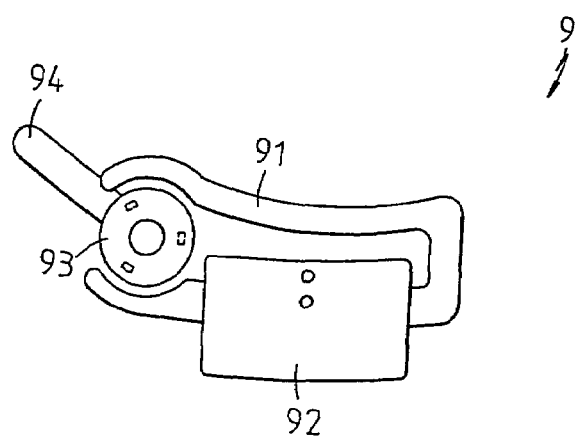
FIG. 2 is a lateral schematic view of the prior art driving assembly of camera shutter and diaphragm.
Figure 3:
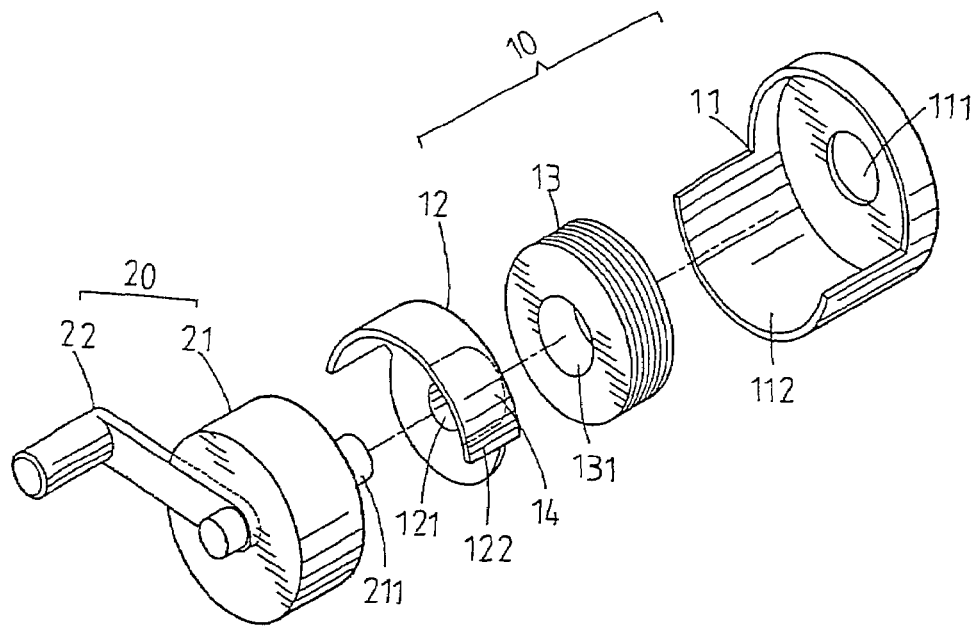
FIG. 3 is an exploded perspective view of the driving assembly of camera shutter and diaphragm of the present invention.
Figure 4:
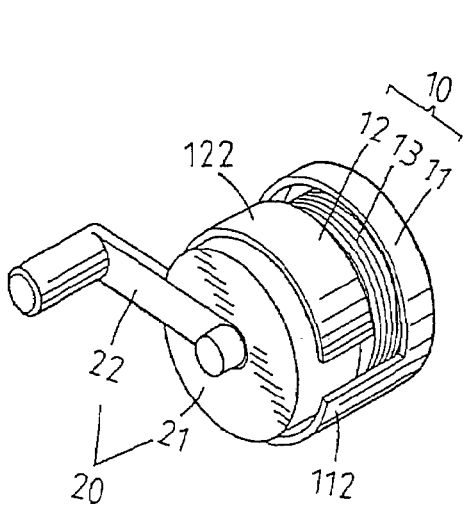
FIG. 4 is a perspective view of the driving assembly of camera shutter and diaphragm of the present invention.
Figure 5:
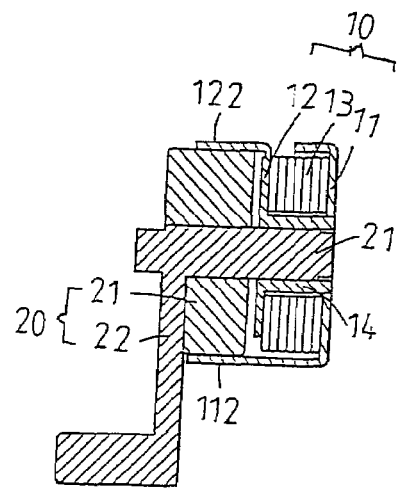
FIG. 5 is a schematic cross sectional view of the driving assembly of camera shutter and diaphragm of the present invention.

Referring to FIGS. 3 to 5, the driving assembly of a camera diaphragm or a shutter of the structure of the present invention is illustrated. The present invention has the following elements.

A driving portion 10 has a first stator 11, a second stator 12 and a coil set 13. The first stator 11 is formed as a round cover a center of which has a positioning hole 111 for assembling the second stator 12. A first wing 112 is axially extended around a radial periphery of the first stator 11. A radius extend of the first wing 112 is slightly smaller than 180 degrees. The second stator 12 is a round disk. A center of the second stator 12 has a through hole 121. An iron core 14 is formed axially around the through hole 121. The ion core 14 can be assembled to the positioning hole 111 of the first stator 11. A second wing 122 is formed around a radial periphery of the second wing 122 and extended axially from the second stator 12. A radius extend of the second wing 122 is slightly smaller than 180 degrees. A center of the coil set 13 has a through hole 131.

In assembly, the positioning hole 111 of the first stator 11, the through hole 121 of the second stator 12 and the through hole 131 of the coil set 13 are aligned. The coil set 13 is positioned between the first stator 11 and second stator 12.

The iron core 14 of the second stator 12 extends into the through holes 121, 131 so as to assembled to the first stator 11, second stator 12 and coil set 13 together. The iron core 14 is positioned at the positioning hole 111 of the first stator 11 and passes through the through hole 131 of the coil set 13 and the coil set 13 is installed between the first stator 11 and the second stator 12. The first wing 112 and first wing 112 are arranged alternatively so as to form a round space.

A rotation portion 20 is installed in the space formed by the first wing 112 and second wing 122. The rotation portion 20 includes a magnetic rotor 21 and a driven unit 22 driven by the rotor 21. The rotor 21 has a spindle 211 which passes through a center space of the iron core 14 so that the rotor 21 is rotatably in the space formed by the first wing 112 and the second wing 122. Rotation of the rotor 21 will make the rotation portion 20 to drive a diaphragm of a camera shutter or a diaphragm.

Referring to FIGS. 4 and 5, the assembly view of the present invention is illustrated. The elements of the driving portion 10 and the rotation portion 20 are installed at the same axis so as to have a firm structure and the volume is reduced greatly.

In the action of the present invention, when current flows into the coil set 13 of the driving portion 10, according to Ampere's Law, the two ends of the coil set 13 will form with two opposite magnetic polarities. The coil set 13 is installed between the first stator 11 and second stator 12 so that the first wing 112 and the second wing 122 will form as two opposite polarities. The rotor 21 between the first wing 112 and second wing 122 will rotate by the action of the magnetic force. Then the driven unit 22 will drive a shutter or a diaphragm so as to open or close and adjust the position thereof. However these are known in the prior art and thus the detail will not be described herein.

Referring to FIGS. 6 to 11, the embodiments about the driving assembly of the present invention are illustrated. In the following those identical to the first embodiment will not be described herein. Only those difference are described.

Figure 6:
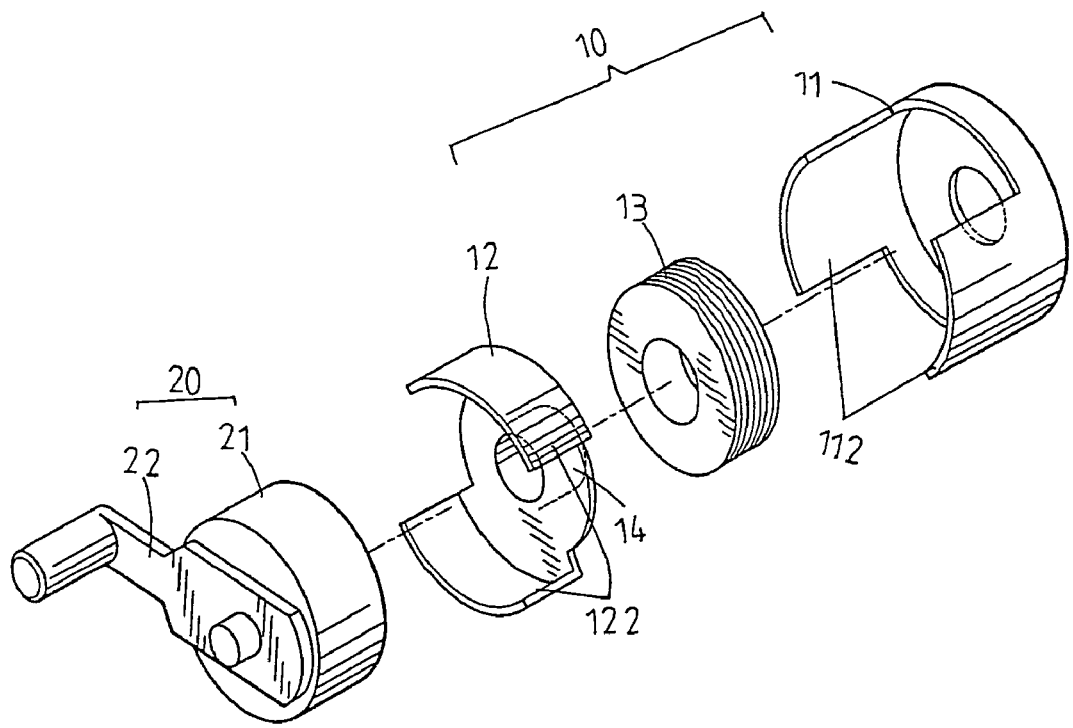
FIG. 6 is an exploded perspective view of the second embodiment of the present invention.
Figure 7:
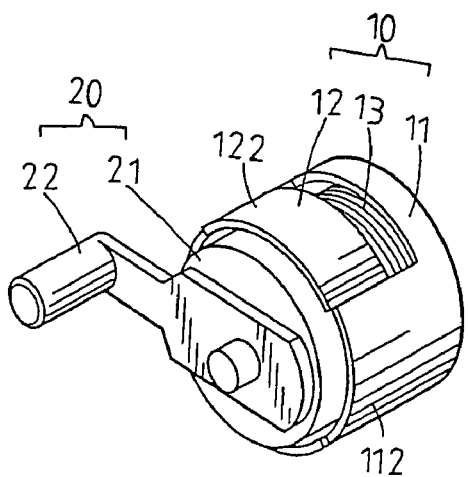
FIG. 7 is a perspective view of the second embodiment of embodiment.

A minimum rotation angle of the rotor 21 of the rotation portion 20 is controlled by the angle of the polarity of the stator. Referring to FIGS. 6 and 7, the first wing 112 and second wing 122 are extended from the first stator 11 and second stator 12, respectively. Each of the first wing 112 and second wing 122 has two parts which are formed around the respective stator and are spaced with an equal spaced. In assembly, the first wing 112 and second wing 122 are alternatively arranged so that the minimum rotation angle of the rotor 21 is reduced to 90 degrees.

Figure 8:
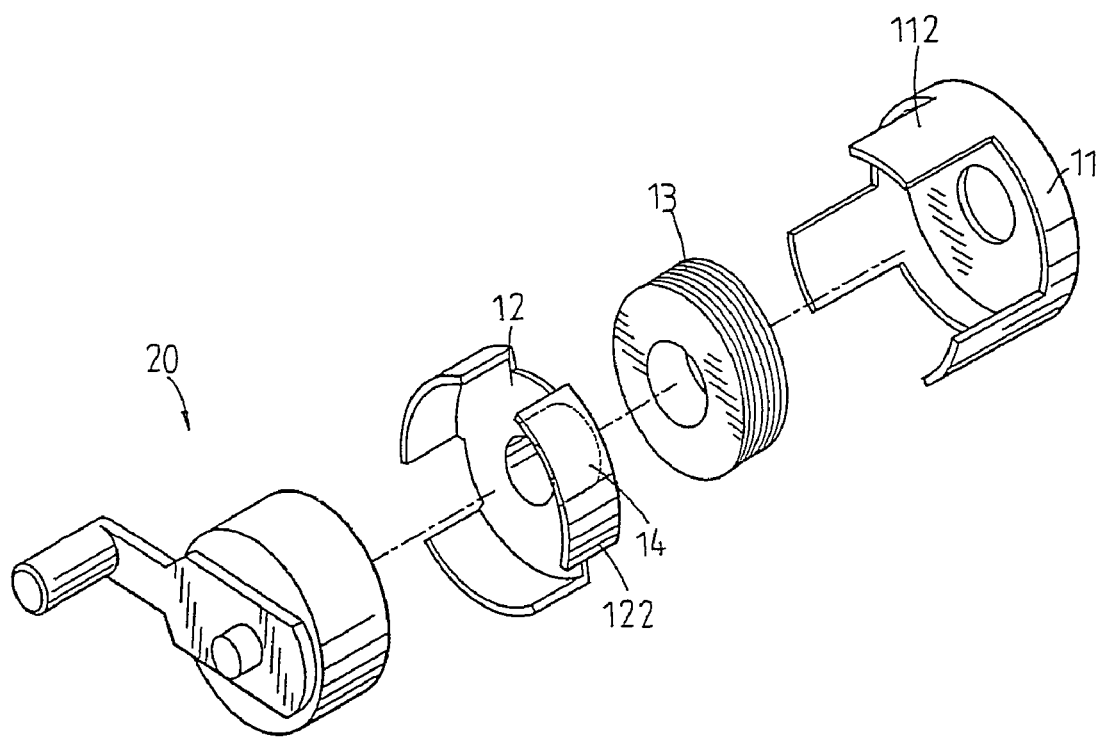
FIG. 8 is an exploded perspective view of the third embodiment of the present invention.
Figure 9:
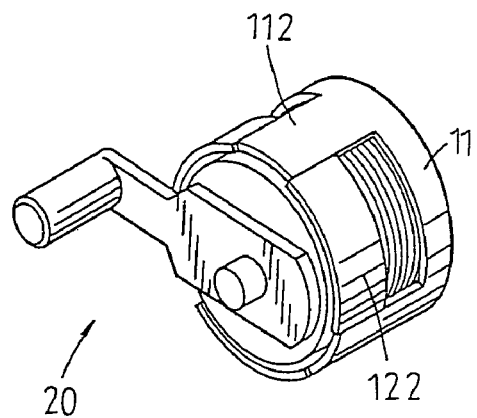
FIG. 9 is a perspective view of the third embodiment of the present invention.

Referring to FIGS. 8 and 9, the third embodiment of the present invention is illustrated. In the following those identical to the first embodiment will not be described herein. Only those difference are described. The first wing 112 and second wing 122 are extended from the first stator 11 and second stator 12, respectively. Each of the first wing 112 and second wing 122 has three parts which are formed around the respective stator and are spaced with an equal spaced. In assembly, the first wing 112 and second wing 122 are alternatively arranged so that the minimum rotation angle of the rotor 21 is reduced to 60 degrees.

Figure 10:
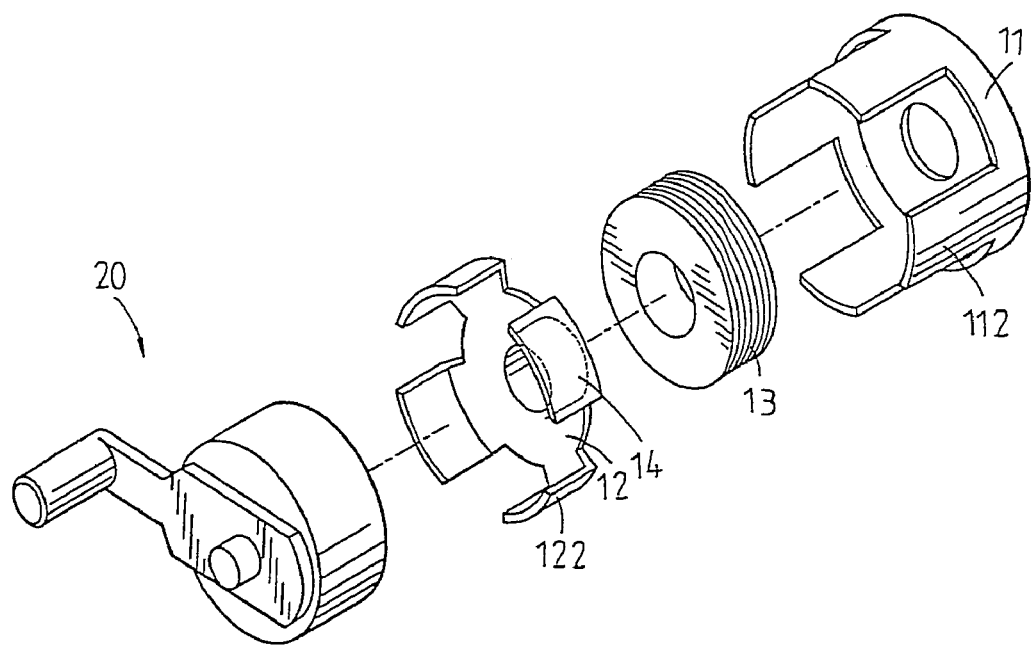
FIG. 10 is an exploded perspective view of the fourth embodiment of the present invention.
Figure 11:
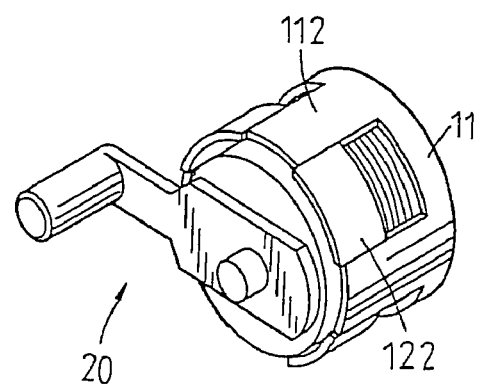
FIG. 11 is a perspective view of the fourth embodiment of the present invention.

Referring to FIGS. 10 and 11, the fourth embodiment of the present invention is illustrated. In the following those identical to the first embodiment will not be described herein. Only those difference are described. The first wing 112 and second wing 122 are extended from the first stator 11 and second stator 12, respectively. Each of the first wing 112 and second wing 122 has four parts which are formed around the respective stator and are spaced with an equal spaced. In assembly, the first wing 112 and second wing 122 are alternatively arranged so that the minimum rotation angle of the rotor 21 is reduced to 45 degrees.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A driving assembly of camera shutter and diaphragm comprising:

a first stator, a second stator, a coil set and a rotor;

wherein the coil set is installed between the first stator and second stator; a first wing is axially extended from a round periphery of the first stator and a second wing is axially extended from a round periphery of the second stator; each of the first stator and second wing is a round cambered sheet; in assembly the first stator and second wing are formed as a space for receiving the rotor; thus the rotor is driven to rotate by the magnetic force of the first wing and second wing so as to drive the diaphragm and shutter.

2. The driving assembly of camera shutter and diaphragm as claimed in claim 1, wherein the rotor is installed with a driven unit so as to drive the diaphragm and shutter.

3. The driving assembly of camera shutter and diaphragm as claimed in claim 1, wherein the first stator is a round shape, a center of the first stator has a positioning hole; the second stator has a shape like a disk; a center of the second stator has a through hole; an iron core is axially extended from a periphery of the through hole; the iron core is positioned within the positioning hole; a spindle of the rotor is rotatably installed within the iron core so that the rotor is positioned in the space formed by the first wing and second wing.

4. The driving assembly of camera shutter and diaphragm as claimed in claim 1, wherein each of the first wing and second wing have a plurality of parts which are formed around the respective stator and are spaced with an equal spaced; in assembly, the first wing and second wing are alternatively arranged, in assembly, the first wing and second wing are alternatively arranged so that the minimum rotation angle of the rotor is reduced.

5. The driving assembly of camera shutter and diaphragm as claimed in claim 4, wherein each of the first wing and second wing have two parts so that the minimum rotation angle of the rotor is reduced to 90 degrees.

6. The driving assembly of camera shutter and diaphragm as claimed in claim 4, wherein each of the first wing and second wing have three parts so that the minimum rotation angle of the rotor is reduced to 60 degrees.

7. The driving assembly of camera shutter and diaphragm as claimed in claim 4, wherein each of the first wing and second wing have four parts so that the minimum rotation angle of the rotor is reduced to 45 degrees.

* * * * *